United States Patent [19]

Nagai et al.

[11] Patent Number: 4,784,113

[45] Date of Patent: Nov. 15, 1988

[54] HANDY HEATING CONTAINER

[75] Inventors: Kenji Nagai; Toshiaki Mizuhata; Tuneo Kita, all of Osaka, Japan

[73] Assignee: Kita Sangyo Co., Ltd., Osaka, Japan

[21] Appl. No.: 127,910

[22] Filed: Dec. 2, 1987

[30] Foreign Application Priority Data

Dec. 22, 1986 [JP] Japan .............................. 61-197786[U]
Feb. 25, 1987 [JP] Japan .................................. 62-43597

[51] Int. Cl.[4] ................................................ F24J 1/00
[52] U.S. Cl. .......................................... 126/263; 62/4
[58] Field of Search ............... 126/263, 246, 262, 261; 426/113, 114; 44/3.3; 219/222; 62/4

[56] References Cited

U.S. PATENT DOCUMENTS

| 827,222 | 7/1906 | Espenhayn et al. | 126/263 |
|---|---|---|---|
| 2,541,736 | 2/1951 | Alexander | 126/263 |
| 3,314,413 | 4/1967 | Cambridge | 126/263 |
| 3,970,068 | 7/1976 | Sato | 126/263 |
| 4,559,921 | 12/1985 | Benmussa | 126/263 |
| 4,640,264 | 2/1987 | Yamaguchi et al. | 126/263 |

Primary Examiner—Randall L. Green
Attorney, Agent, or Firm—Koda and Androlia

[57] ABSTRACT

The invention relates to heating containers and, more particularly, to a handy heating container in which food or drink, canned or otherwise, to be heated, such as "sake", coffee, soup, curry, or the like, is set ready for being heated. The heating container has a water discharge device provided on the underside of a solution package containing water or a solution consisting principally of water; and the solution package and a heat generating material are housed in a retainer portion. With this arrangement, exothermic reaction progresses upward from the bottom portion of the heat generating material so that the can is efficiently heated. Furthermore, any water vapor produced is absorbed by the upper portion of the heat generating material so that water vapor jetting through the gap between the can and the container or blowing out of the can is effectively prevented.

4 Claims, 9 Drawing Sheets

HANDY HEATING CONTAINER

BACKGROUND OF THE INVENTION

This invention relates to heating containers and, more particularly, to a handy heating container in which food or drink, canned or otherwise, to be heated, such as "sake", coffee, soup, or the like, is set ready for being heated.

Conventionally, a fast heating container comprises a storage chamber for a foodstuff or drink contained in a can, and a reaction chamber for heat generation, the chambers being integrally connected. As such, the manufacture of such heating container requires a rather complicated process. Another difficulty with such heating container is that the can for the food or drink cannot be heated.

In view of these difficulties, the present inventors have developed net type fast heating containers which have no particular heating structure provided therein and which, nevertheless, are able to heat cans for foods or drinks. One such heating container is described in Japanese Patent Publication No. 164291 of 1986. This heating container is such that packages of heating mediums, such as quick lime, water, and the like are arranged in the container and a can for a foodstuff or drink is placed on the heating medium packages.

Another such new type heating container developed by the present inventors is described in Japanese Patent Publication No. 238537 of 1986, which represent an improvement over the invention of said Japanese Patent Publication No. 164291 of 1986. This heating container is such that a solution package containing water or a solution consisting principally of water is housed, together with a heat generating material, in a retainer portion, said retainer portion being placed in a container. In one embodiment of the newer invention, the solution package containing water or a solution consisting principally of water is placed on the upper side and the heat generating material is placed on the lower side.

However, the invention of said Japan Pat. publication No. 238537/1986 has a difficulty in that since the solution package is placed above the heat generating material, exothermic reaction progresses downward from the upper portion of the heat generating material when the solution discharge device is manipulated, so that when heat generation has progressed down to the lower portion of the heat generating material, the upper portion of the heat generating material interferes with upward heat transfer from the lower portion of the heat generating material, with the result that the food or drink being heated is not sufficiently heated.

Another difficulty is that if the food or drink in the can is taken before the end of the exothermic reaction, the interior of the retainer portion is overheated to cause a large amount of water vapor to be generated, because the heat is not absorbed into the food or drink. As a consequence, it is very likely that abnormalities, such as water vapor jetting out through the gap between the can and the container or the can being blown off under a large internal pressure, will occur, which involved considerable danger.

SUMMARY OF THE INVENTION

This invention is intended to overcome the foregoing problems and is based on the discovery that by providing a water discharge device on the underside of the solution package it is possible to efficiently heat the can or the like and to prevent jetting out of water vapor through the gap between the can and the container and blowing off of the can.

Accordingly, it is an object of the invention to provide a handy heating container which permits exothermic reaction to progress upward from the lower portion of the heat generating material and which is thus able to efficiently heat the can or the like with the heat generating material without allowing the upper portion of the heat generating material to hinder heat transfer from the lower portion of the heat generating material.

It is another object of the invention to provide a handy heat generating container in which water or a solution consisting principally of water is supplied to the lower portion of the heat generating material and in which any water vapor generated is absorbed into the upper side heat generating material only so that water vapor jetting through the gap between the can and the container and blow off of the can may be effectively prevented.

It is another object of the invention to provide a handy heating container which can be manufactured at lower cost through the adoption of an integral construction of the solution package/retainer portion and which can minimize the possibility of outward leak of the heat generating material through the provision of a solution discharge device in the bottom of the retainer portion, thereby also achieving both complete sealing of the retainer portion and easy breaking thereof.

It is a further object of the invention to provide a handy heating container which requires less force for pulling a pull band for the solution discharge device of the solution package when releasing a film seal for the discharge device, thus eliminating the possibility of the container being vigorously shaped when the pull band is pulled, and which requires no decrease in the adhesion strength of the film and thus eliminates the possibility of solution leak due to vibration and dropping in the course of handling and transport.

In order to accomplish the foregoing objects, the handy heating container of the invention is so constructed that a retainer portion in which a heat generating material and a solution package containing water or the like solution are arranged in position is placed on the container, while a can for food and drink is placed in a space above the retainer portion, all the components being packed into an integral unit.

The solution package is housed in the retainer portion, with heat generating material above and under the solution package; or it is housed in the retainer portion so that the underside of the solution package is positioned adjacent the bottom of the retainer portion; or it is accommodated in the retainer portion so that the underside of the solution package is integrally connected with the bottom of the retainer portion. Furthermore, a water discharge device is provided on the underside of the solution package to ensure that exothermic reaction of the heat generating material will proceed upward from the lower portion of the material, and thus to allow the can, etc. to be efficiently heated by the heat generating material. The solution discharge device for the solution package requires less force for pulling the pull band for the discharge device, which fact eliminates the possibility of the container being so vigorously shaked as to cause spilage of its content.

DETAILED DESCRIPTION OF THE INVENTION

Preferred embodiments of the invention will now be described with reference to the accompanying drawings.

Figure 1:
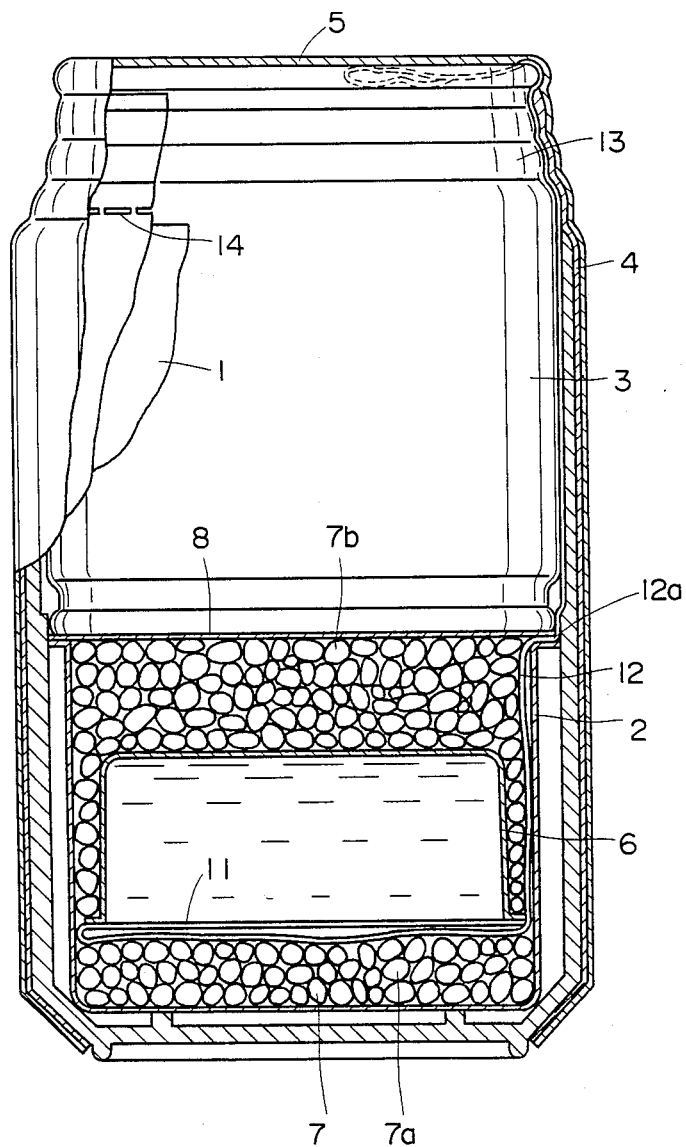
FIG. 1 is a partially broken-away side view of a handy heating container representing a first embodiment of the invention.

FIG. 1 shows a first embodiment of the invention. The handy heating container comprises a container, granules of a heat generating material placed therein., and a can containing food or drink set in a space above the heat generating material, all being integrally packaged.

The handy heating container consists essentially of a container 1, a retainer portion 2, a can 3 which contains food or drink, a packaging film 4, and a shrink package 5.

The container 1 may be made of a synthetic resin material, such as polypropylene or polyethylene, or of paper, metal, or other material.

Figure 2:
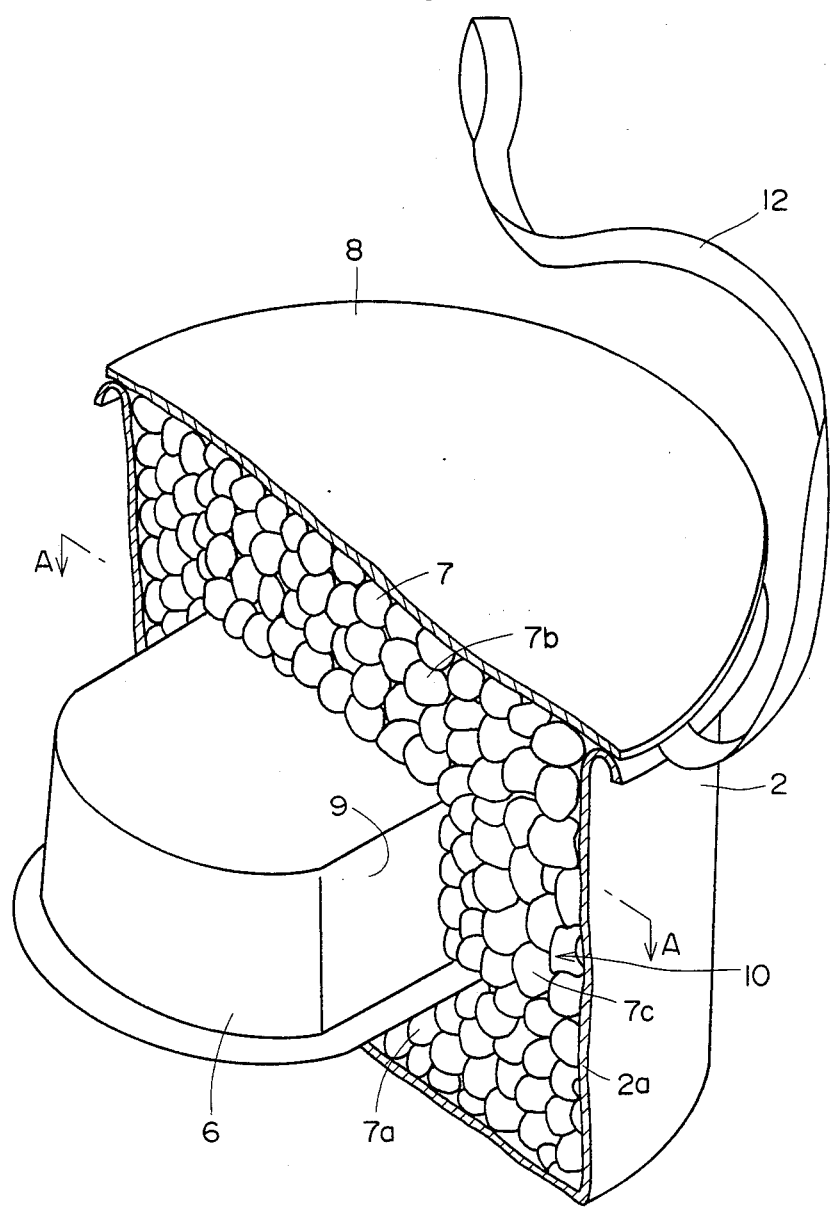
FIG. 2 is a partially cutaway perspective view of a retainer portion
Figure 3:
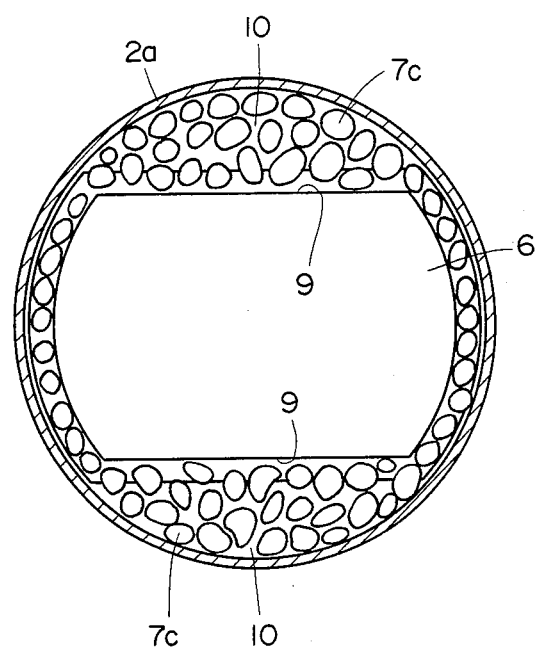
FIG. 3 is a section taken along a line A—A in FIG. 2.

The retainer portion 2 comprises, as FIG. 2 shows, a package of water or of a solution consisting principally of water 6 which is centrally disposed therein, and granules of a heat generating material 7 filled above and under the solution package 6, the retainer portion 2 being heat sealed with a sealing film 8. Further, as FIG. 3 shows, the solution package 6 has straight side walls 9, a space 10 being defined between each of said side walls 9 and an adjacent side wall 2a of the retainer portion 2. Granules of heat generating material 7 are also filled in said space 10.

A bottom film member 11 having a directional property is in bond with the underside of the solution package 6, said bottom film member 11 being provided with discharge means for discharging the water or the solution consisting principally of water. The discharge means comprise a pull band 12 connected to the bottom film member 11. When the pull band 12 is pulled, the bottom film member 11 is broken so that the water or solution is discharged. The pull band 12 extends outward from the retainer portion 2.

The heat generating material 7 is, by was of example, a mixture material consisting principally of calcium oxide or the like, which generates heat by reacting with water or the solution consisting principally of water.

The solution consisting principally of water includes, for example, a preservative, a nonfreezing liquid, or the like.

The sealing film 8 should be a material having moisture barrier properties and heat shrinkability, such as an oriented laminated film containing vinylidene chloride. Use of such material as the sealing film 8 accelerates heat transfer to the can 3 because the material is shrunk by heat so that the opening of the retainer portion 2 is made wide open.

The can 3 contains such food or drink as "sake", coffee, soup, curry, sausage, or the like.

The packaging film 4, being a heat-shrinkable film, e.g., an expanded polyolefin film, covers the outer surface of side walls 1a of the container 1, and the upper neck-in portion 13 of the can 3 which projects from the container 1.

The packaging film 4 is formed with a slit 14 (see FIG. 1),. which serves for the purpose of purging any excess water vapor which may be produced by any abnormal, reaction. The slit 14 also serves for the purpose of preventing possible excessive increase in the internal pressure.

The shrink package 5 covers the entire container including the can 3 placed therein, thereby forming it into an integrally packaged product. Further, the shrink package 5 serves to prevent the pull band 12 from being accidentally pulled during transport or at other times.

The construction of the handy heating container has now been explained. To manufacture such heating container, a solution package 6 containing water or a solution consisting principally of water is first prepared, and it is placed, together with the heat generating material 7, in the retainer portion 2, the retainer portion being then sealed with the sealing film 18. In this conjunction, the pull band 12 of the solution package 6 is led outward of the retainer portion 2.

Preferably, wax is applied to a portion 12a of the pull band 12 at which the pull band 12 is held between the sealing film 8 and the retainer portion 2. Such wax application assures complete sealing of the retainer portion 2 and serves to prevent possible deterioration of the heat generating material 7.

Nextly, the retainer portion 2 is put in the container 1 and the can 3 is placed thereon. The neck-in portion 13 at the top of the can 3 projects outward from the container 1. The end of the pull band 12 is drawn outward from the container 1 for placement on the ceiling of the can 3.

When this condition has been reached, the packaging film 4 is wrapped around the container 1 and the top neck-in portion 13 of the can 3, the composite being then integrally covered by shrink package 5. The process of manufacture has now been completed.

To use the handy heating container, the shrink package 5 is first removed. Then, the pull band 12 is pulled so that the water or the solution consisting principally of water in the solution package 6 is infiltrated into the heat generating material 7. Thereupon, heat generation starts and the retainer portion 2, as a heating source, heats the food or drink inwardly from the bottom and side walls. In the event that water vapor is excessively produced as a result of any abnormal practice, such as heating when the can is emply or otherwise, the water vapor is released through the slit 14.

The process of from the discharge of the water or of the solution consisting principally of water up to heat generation will now be explained in detail. When the pull band 12 is released from the bottom film member 11, the water or the solution consisting principally of water flows down from the bottom film member 11 toward the heat generating material 7a. Exothermic reaction takes place in the heating generating material 7a to produce water vapor. The water vapor goes upward passing through the solution package 6 until it reaches the heat generating material 7b above said package 6. The water vapor is absorbed into granular masses of the heat generating material 7c in the space 10 and of the upper heat generating material 7b so that it is utilized for exothermic reaction of the heat generating masses 7b, 7c. Therefore, heat is generated with no excess vapor being produced.

Further, the fact that heat generating materials 7b, 7c being filled above and alongside the solution package 6 eliminates the possibility of heat transfer being prevented by the solution package as has been the case with the prior art heating containers, and thus efficient heating of the can is assured. Especially at the final stage of heating greater heating efficiency is obtainable. This means considerable improvement over the prior art in which considerable slowdown has been usually seen in the rate of heating up (see FIG. 4).

Figure 5:
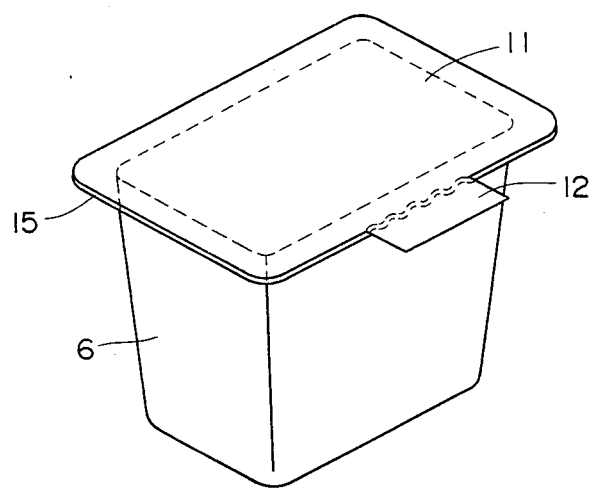
FIGS. 5 and 6 are perspective views showing one form of a solution package.
Figure 6:
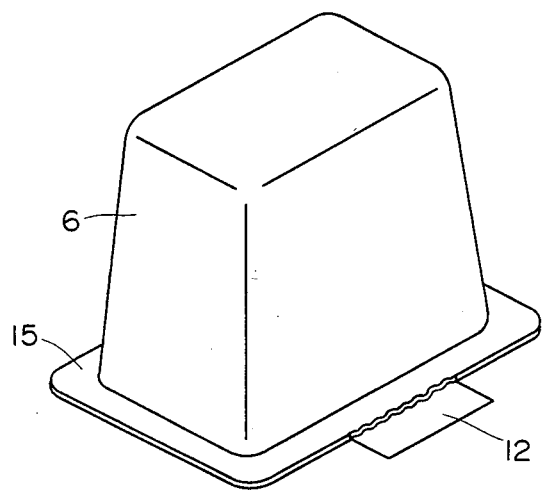

In the embodiment shown in FIGS. 5 and 6, a flange portion 15 of the solution package 6, at outer periperal edges thereof, is partially configured otherwise than straight, a bottom film member 11 being in bond with the top of the flange portion 15. Further, a portion of the bottom film member 11 extends outward from the outer peripheral edge of the flange portion 15 to form a pull band 12.

In the foregoing embodiment, the outer peripheral edge of the flange portion 11 of the solution package 6 is configured otherwise than straight, but alternatively said outer peripheral edge may be wholly configured otherwise than straight. The term "configured otherwise than straight" means such configuration as corrugated, indented, or the like shape. Such configuration serves to considerably reduce the force required in pulling the pull band 12, as compared with the case where straight-line configuration is used. Another advantage of such configuration is that the strength of bond between the bottom film member 11 and the flange portion 15 need not be lowered, which fact eliminates the possibility of leakage of water or the like from the solution package 6 prior to heating operation and as a consequence of vibration or dropping in the process of handling or transport.

Figure 7:
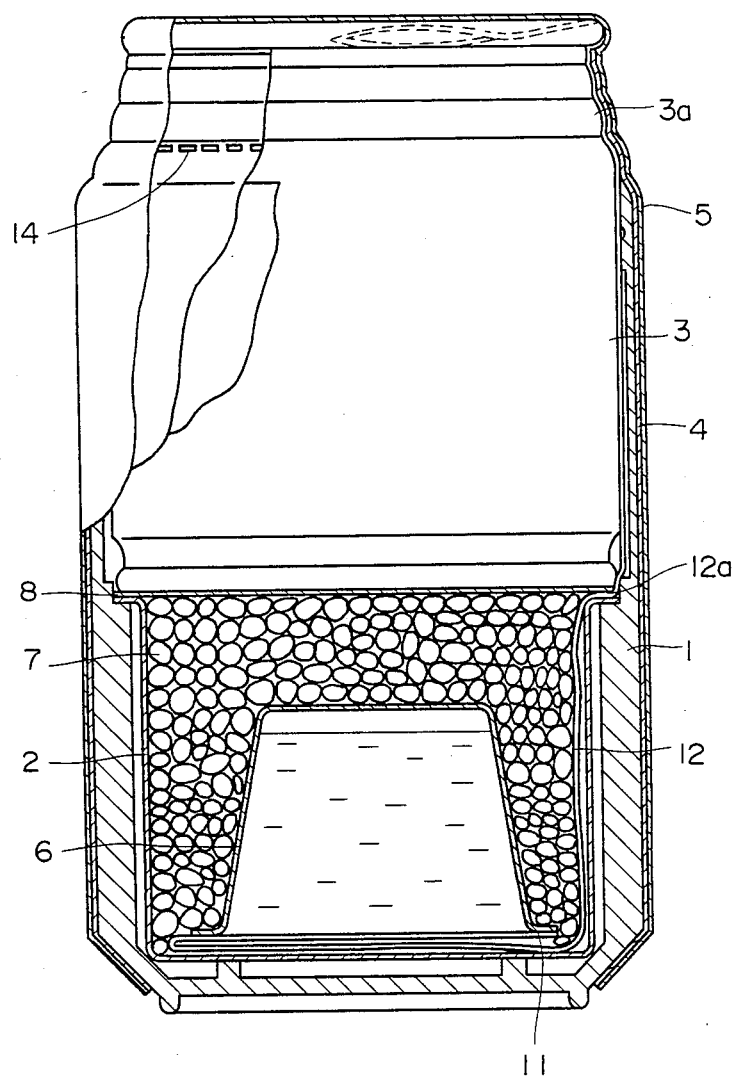
FIG. 7 is a partially broken-away side view of a handy heating container representing a second embodiment of the invention.

FIG. 7 shows a second embodiment in which the retainer portion 8 houses the solution package 6 and the heat generating material 7, the underside of the solution package 6 being positioned adjacent the bottom of the retainer portion 2, and in which the heat generating material 7 is filled in bulk form in the retainer 2 and above and around the solution package 6.

Figure 8:
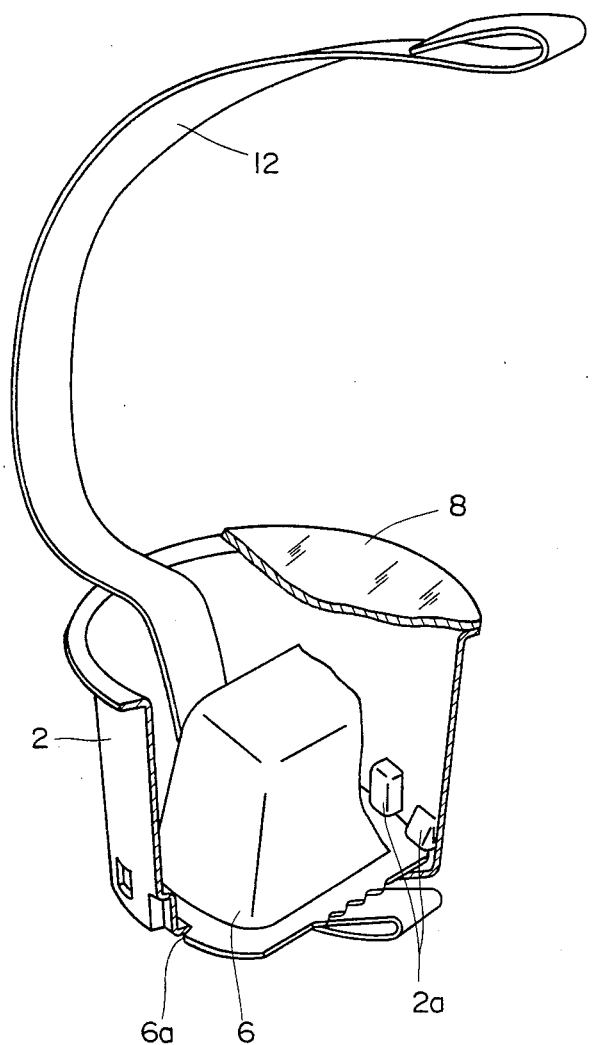
FIG. 8 is a partially broken-away perspective view showing a retainer portion of the second embodiment.

As FIG. 8 shows, protuberances 2a may be provided at the bottom of the retainer portion 2 while recesses 6a are provided at the bottom of the solution package 6; by fitting these protuberances 2a into the recesses 6a, the solution package 6 can be secured to the retainer portion 2 so that the former can be prevented from shaked in the latter through any vibration or shock caused during transport.

Figure 9:
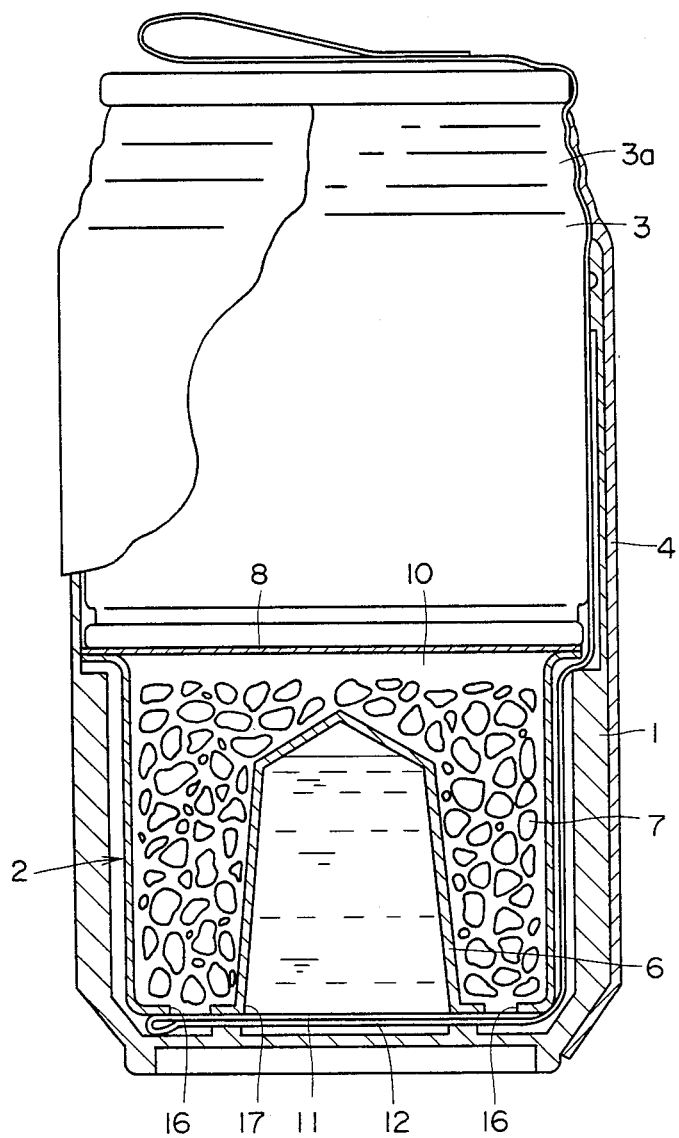
FIG. 9 is a partially broken-away side view of a handy heating container representing a third embodiment of the invention.
Figure 10:
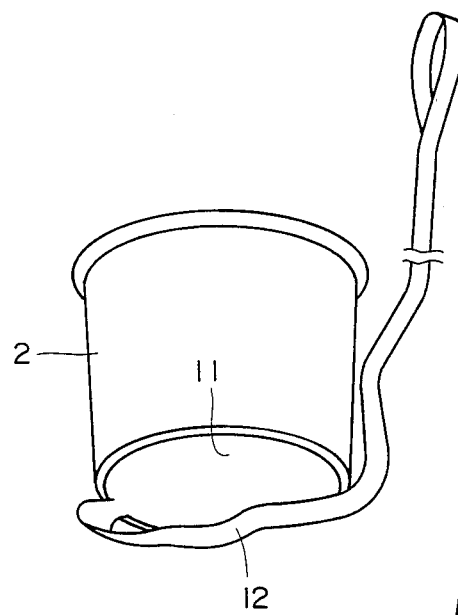
FIGS. 10 and 11 are perspective views showing a retainer portion of the third embodiment, as it appear at pre-breaking state (FIG. 10) and at post-breaking state (FIG. 11).
Figure 11:
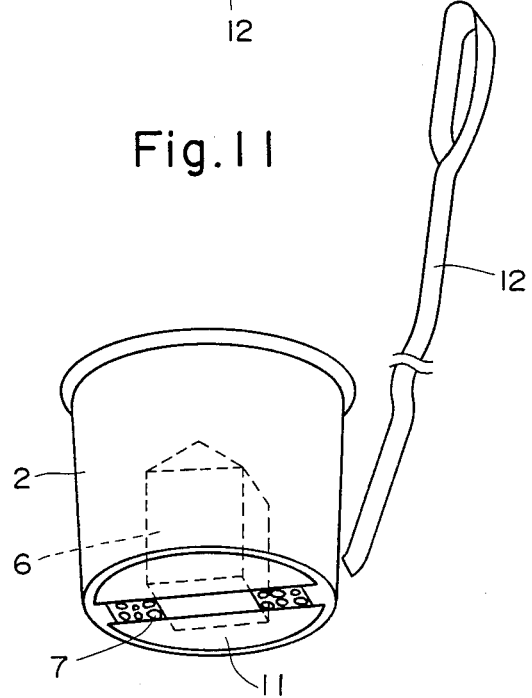

FIG. 9 shows a third embodiment in which the retainer portion 2 has a space 10 for housing the heat generating material 7 and a separately defined solution package 6, both being integrally formed in the retainer portion 2. Openings 16, 17 of the solution package 6 are provided at the bottom of the retainer portion 2, said openings 16, 17 being sealed with a bottom film member 11. As FIGS. 12 and 13 show, the bottom film member 11 is provided with a pull band 12.

Heat-up experiments were conducted with the handy heating container for two cases, one is which the can has a content, the other in which the can has no content.

[Experiment 1]

Figure 4:
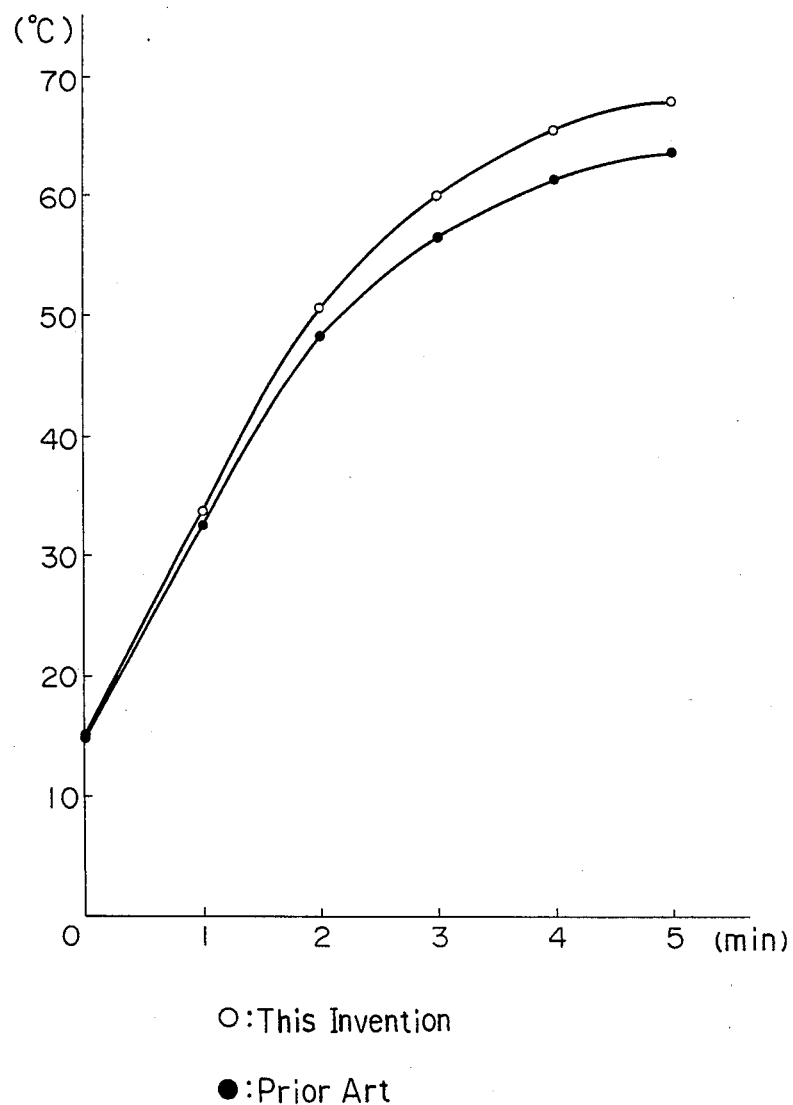
FIG. 4 is a graph showing heating curves for comparison of the invention with the prior art.

This represents the case in which the can has a content. Experimental results are shown in FIG. 4.

Experimental conditions

Can steel can with 190 g content (can dia. #211)
Content : coffee
Solution package : portion pack containing 40 ml of water
Heat generating material: 80 g of a mixture of calcium oxide, etc.
Arrangement:
The invention : 40 g each of heat generating material was filled above and under the solution package.
Prior art : 80 g of heat generating material was filled below the solution package.

Experimental results

In initial heating-up rate, the invention was well comparable to, or slightly superior to the prior art. The difference became greater with time. Especially at the final stage of heating up, the rate of heat up with the heating container of the invention wa far much greater than that of the prior art In the highest temperature reached, the invention was superior to the prior art.

[Experiment 2]

This represents the case in which the can has no content. Experimental conditions were same as in Experiment 1 except that the can is empty.

Experimental results

It was found with the prior art that in 10-20 seconds after the start of heating, water vapor and water rise up through the gap between the top of the packaging film 4 and the can 3, as well as through the slit 14, and in about 30 seconds the can was blown out from the container.

In contrast, with the container of the invention, water vapor began to come out in about 50 seconds and continued to come out for about 2 minutes. However, such water vapor outflow was small in quantity. To the last there was no jumping out of the can from the container.

What is claimed is:
1. A handy heating container having a retainer portion in a container, a storage space provided above the retainer portion for housing a can for food or drink, there being housed in said retainer portion a heat generating material and a solution package containing water or a solution consisting principally of water, characterized in that the solution package is integrally formed with the retainer portion and in that openings of the solution package are provided in the underside of the retainer portion, said openings being sealed with a film-like material, water discharge means being provided on the underside of the solution package, said water discharge means of said solution package being in the form of a pull band extension comprising a part of the under- side of and extending from the outer peripheral edge of the flange.

2. A handy heating container as set forth in claim 1 wherein said container is a cylindrical structure.

3. A handy heating container as set forth in claim 1 wherein the outer peripheral edge of a flange portion of said solution package is partially or wholly configured otherwise than straight.

4. A handy heating container as set forth in claim 1 or 3 wherein the underside of said solution package is a film-like material.

* * * * *